Patented Aug. 19, 1941

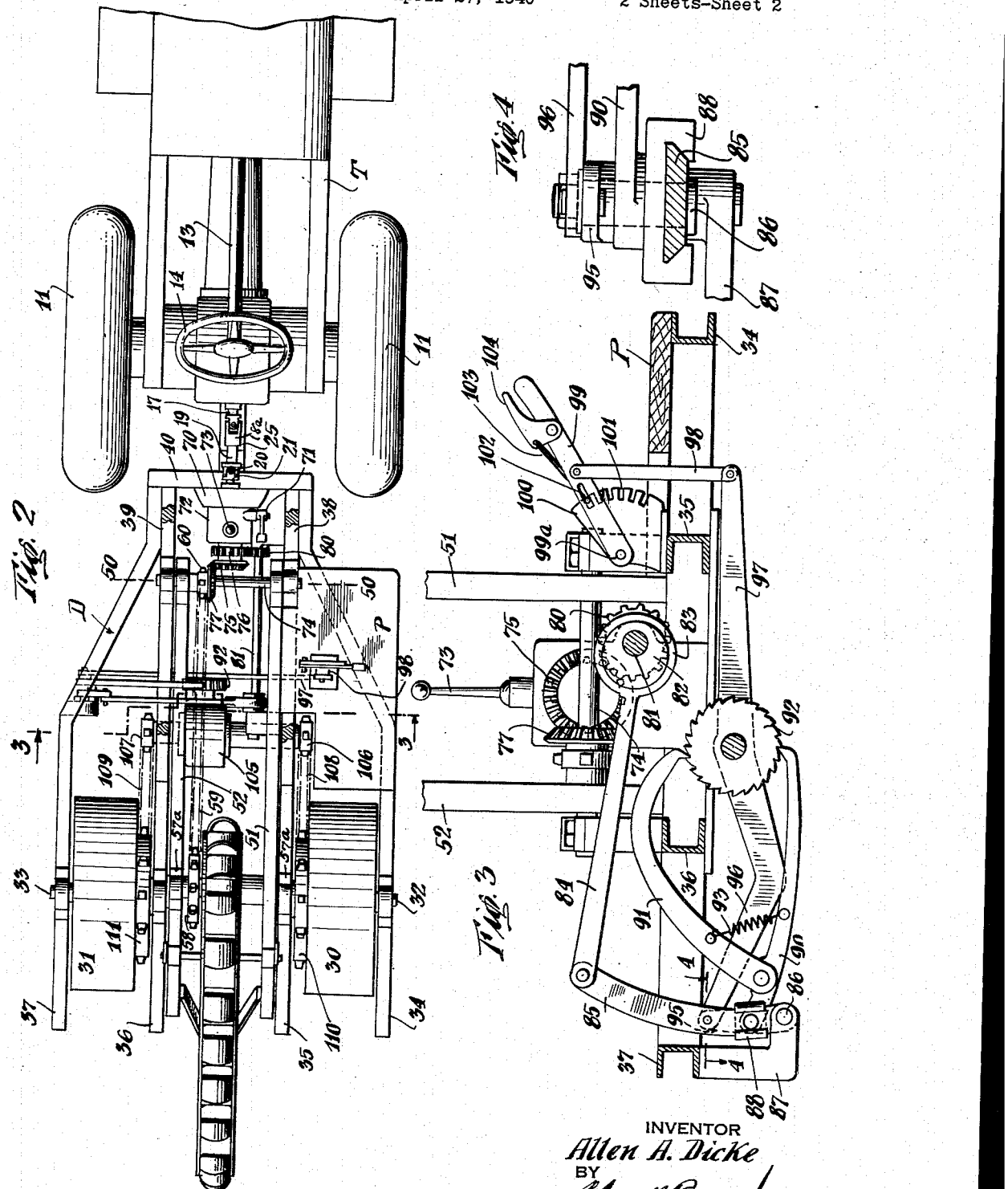

2,252,837

UNITED STATES PATENT OFFICE 2,252,837

DITCHING MACHINE

Allen A. Dicke, Montclair, N. J.

Application April 27, 1940, Serial No. 332,039

12 Claims. (Cl. 37—97)

This invention relates to improvements in ditching machines particularly to machines of this type especially adapted for digging trenches for the laying of drainage tile, water pipes, telephone lines, power conduits, etc.

It is an object of the present invention to provide an improved machine of this type which is so constructed that it may be connected with an ordinary farm tractor in such a way that its forward end may be supported by the ordinary draw bar construction of standard tractors and whereby the excavating mechanism and the traversing mechanism of the ditching machine may be connected with and be driven by the ordinary power take-off of the tractor. In this way it is possible to build a machine which is very much cheaper because it does not require its own power plant and the transmission mechanism from the power plant to the ground wheels is greatly simplified.

Another object of the invention is to provide a machine of the type referred to in which the power take-off of a tractor of standard construction is so connected to the ditching machine proper as to not only operate the excavating mechanism whether it be a wheel, an endless chain, or other device, but also to cause the machine to be advanced along the ground as the trench is being formed, during which time the ditching machine pushes the tractor at the very low speed required when excavating.

Another object of the invention is to provide a ditching machine which at times is moved forwardly by power delivered from the power take-off of a standard tractor acting upon the ground wheels of the ditching machine and which at other times is pulled by the tractor as when the machine is transported along the highway or from one operation to another. Thus, the ditching machine at certain times pushes the tractor and at other times is pulled by the tractor.

It is another object of the invention to provide a construction adapted to be associated with a standard tractor in such a way that at certain times the tractor serves as a support for a part of the ditching machine.

It is another object of the invention to provide such a machine so associated with a standard tractor that the tractor serves to support a portion of the ditching machine and also serves as a steering mechanism therefor, suitable extensions being preferably provided whereby the steering mechanism of the tractor may be operated from the operator's position upon the ditching machine.

Another object is to provide a simple, convenient and effective mechanism for varying the speed of advance during ditching.

Other objects will appear from the following description of an illustrative embodiment of the invention taken together with the attached drawings wherein:

Fig. 2 is a plan view of the devices shown in Fig. 1, the transverse earth conveying mechanism and certain other parts being omitted for clarity of illustration;

Fig. 3 is a detailed view comprising a cross-section taken along the line III—III of Fig. 2 on a somewhat enlarged scale, whereas Fig. 4 is a cross-sectional view taken along the line IV—IV of Fig. 3 enlarged somewhat further.

Figure 1:
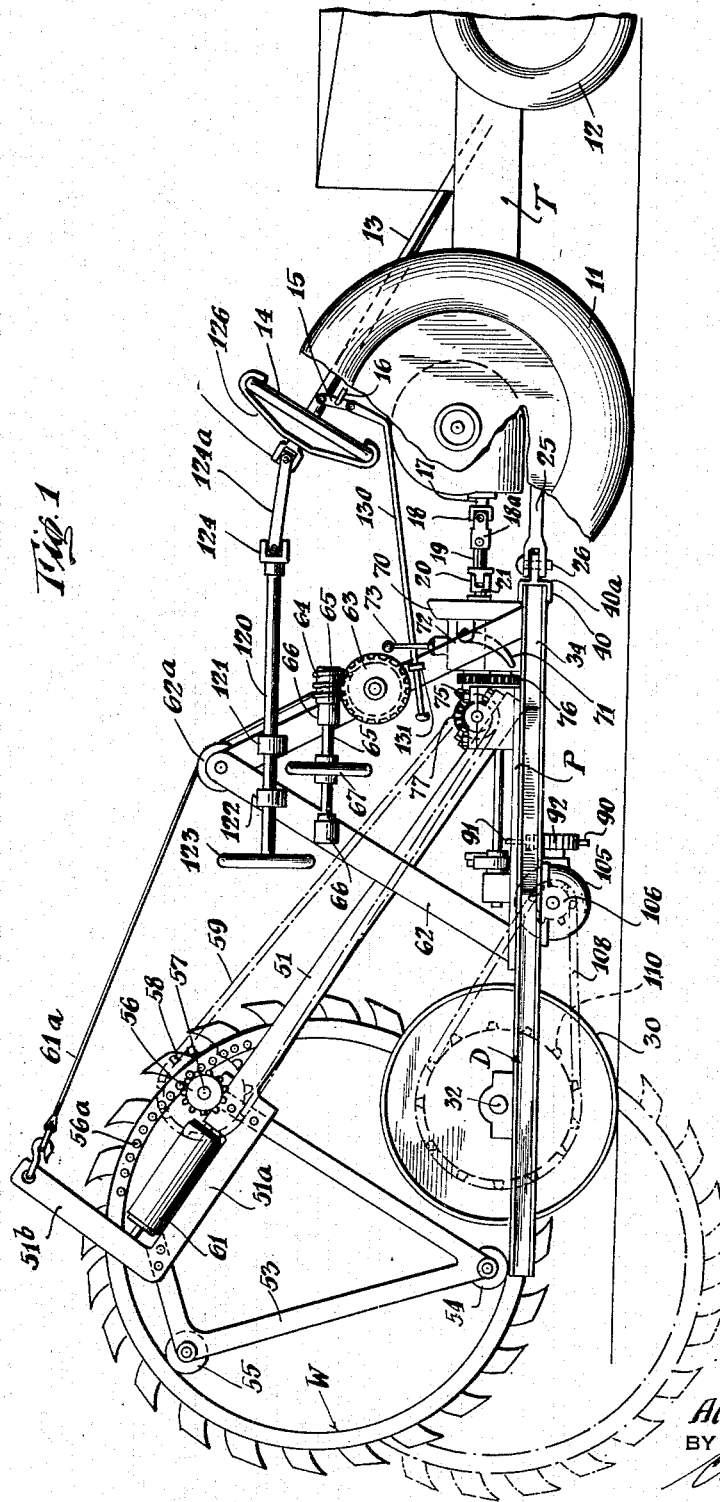
Fig. 1 is an elevation of a ditching machine illustrating the invention shown connected to a tractor of standard construction, certain parts being broken away to more clearly show the mechanism.

Referring to the drawings, the letter T designates generally a tractor of any standard construction, the numeral 11 designating the rear ground wheels of such a tractor which are usually driving wheels and the numeral 12 designating the usual front steering wheels. The wheels 12 are controlled for steering by any suitable mechanism controlled by a shaft in steering column 13, the steering wheel 14 being connected to said shaft (not shown). 15 indicates the usual throttle or governor control lever of such a tractor which through rod 16 controls the throttle or the governor.

The numeral 17 indicates the usual power take-off shaft of any standard tractor connected to universal joint 18, axially slidable splined connection 18a, shaft 19, and universal joint 20 with the shaft 21 forming the input power shaft of a suitable transmission mechanism to be described later.

The letter D represents generally the ditching machine. Its rear portion is supported upon the ground by means of ground engaging means such as wheels 30 and 31 supported respectively upon shafts 32 and 33. The shaft 32 extends between frame members 34 and 35 whereas the shaft 33 extends between frame members 36 and 37. Each pair of frame members extends forwardly and are connected together as at 38 and 39 and by means of cross bar 40 having a hitch 40a connecting with the usual draw bar 25 of the tractor by means of pin 26.

Pivotally supported with respect to the frame 34, 35, 36, 37, 40, preferably about the axis 50, is a second frame comprising side members 51 and 52. This frame serves to support the excavating member such as the ditching wheel W which may be of usual or other suitable construction and supported in the usual manner as by means of rollers 54 and 55 carried on frame 53 attached to the excavating frame 51, 52, and one or more pinions 56 carried by shaft 57 mounted in bearings 57a on the members 51 and 52, which, in turn, carries a sprocket wheel 58 cooperating with sprocket chain 59, the other end of which passes around a sprocket 60 to be described later. The pinion 56 interengages with teeth 56a on the excavating wheel.

It will be seen therefore that when sprocket 60 is rotated the excavating wheel W will also be rotated and in the usual manner will loosen the earth in its path and elevate it to a position where it will be dropped upon the transverse earth conveying belt 61 of usual construction driven preferably from shaft 57 by suitable gearing not shown.

Attached to the side members 51 and 52 are rearwardly extending angle members 51a and 51b which serve to support the conveyor mechanism and the upwardly extending parts of which have attached thereto the end of a cable 61a which, as shown, passes over a sheave 62a supported on a frame 62 and is wound upon a drum (not shown) which is actuated by means of a worm wheel 63 with which engages a worm 64 on a shaft 65 supported in bearings 66 carried by the frame 62. Upon said shaft 65 is shown a hand wheel 67. It will be noted that by rotating the hand wheel 67 or by applying power thereto to shaft 65, the elevation of the frame 51, 52, and the excavating wheel W may be adjusted as required to cut the desired depth of trench.

The numeral 70 indicates a housing for a clutch actuated by a clutch pedal 71. 72 indicates the housing of a usual transmission such as the speed change transmission used in automobiles, the gears of which are controlled by a lever 73 in the usual manner. Extending rearwardly from said transmission is a shaft which carries the beveled gears 75 and preferably also a pinion 76. The bevel gear 75 meshes with another bevel gear 77 connected with the sprocket 60. In the form shown, the sprocket 60 and bevel gear 77 are mounted for rotation upon a shaft 74 which also serves as the pivot pin upon which the excavating wheel frame 51, 52 is pivoted relative to the main frame of the ditching machine.

By the means so far described, power may be transmitted from the power take-off of the tractor to rotate the excavating wheel W at a speed dependent upon the gear ratio selected by the gear shift lever 73.

The means will now be described whereby the ditching machine is caused to advance slowly during the excavating operation. The pinion 76 previously mentioned is shown as engaging a pinion 80 mounted on shaft 81, the rearward end of which is provided with an eccentric 82 encompassed by the ring 83 connected with link 84 which, in turn, is pivoted to the upper end of a segment link 85, the lower end of which is pivoted at 86 upon a bracket 87 carried by the side frame member 37.

Slidably mounted upon the segment 85 is a shoe 88 pivotally attached to which is an operating dog 90 to which is pivoted a second operating dog 91, which dogs cooperate with a ratchet wheel 92 being pressed thereon as by tension spring 93. Also connected to the shoe 88 is an upwardly extending link 95 the upper end of which is pivoted to an arm 96, 97, preferably mounted co-axially with wheel 92. The free end of lever 97 has connected thereto a link 98 pivoted to a hand lever 99 which is pivoted at 99a to a bracket 100 on the frame, which bracket is formed with a plurality of recesses 101 to receive a cross bolt 102 associated with link 103 pivoted to the releasing handle 104.

It will be seen that in the position of the parts shown, the amount of movement imparted by the segment 85 to the shoe 88 will be very small. However, the operator by pressing on member 104 and thereupon adjusting the lever 99 may cause the shoe 88 to be moved to various positions upon the segment 85 and thus cause the dogs 90, 91 to receive a greater movement so as to cause the ratchet wheel 92 to advance one or more teeth per revolution of shaft 81 and eccentric 82.

By referring to Figs. 1 and 2, it will be seen that the ratchet wheel 92 is connected with a differential mechanism enclosed in housing 105, which differential serves to drive the sprockets 106 and 107 upon which operate sprocket chains 108 and 109 respectively, which chains serve to turn sprocket wheels 110 and 111, respectively, which are connected respectively with ground wheels 30 and 31.

It will be seen therefore that the ditching machine can be caused to advance along the ground at a variable rate, depending upon the setting of lever 99 and that during this operation the ditching machine will push the tractor forwardly along a path determined by the steering mechanism of the tractor, it being understood that the tractor driving road wheels 11 are not engaged with its power plant.

As the operator will usually stand upon the platform P it may be convenient to provide means for steering the tractor from that position. This can be readily accomplished by means of a shaft 120 slidably carried in bearings 121 and 122 and provided with a steering wheel 123. The forward end of shaft 120 is connected by means of universal joint 124, shaft 124a, and universal joint 125 with a clamp 126 engaging the steering wheel 14 on the tractor.

Similarly, the throttle or governor speed control lever 15 of the tractor may be adjusted by means of a rod 130 passing through a suitable bracket 131 carried by the frame 62.

It will be seen that a ditching machine may be constructed in the manner described which is very much cheaper in that it is not necessary to provide a power plant nor steering mechanism. Furthermore, as the ground wheels 30 and 31 are driven only at the comparatively low speed required during excavating operations, the power transmission to these ground wheels may be made very simple.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow:

1. In a ditching machine adapted for connection with a standard farm tractor provided with a power take-off, the combination of a frame, ground engaging means secured to said frame, excavating mechanism, and means for driving said ground engaging means and excavating mechanism, said means being connected with for operation by the power take-off of said tractor.

2. In a ditching machine adapted for connection with a standard farm tractor provided with a power take-off and ground engaging driving means, the combination of a frame, ground engaging driving means and an excavating mechanism connected with said frame, and means for driving said last mentioned ground engaging means and excavating mechanism, said means being connected with for operation by the power take-off of said tractor, whereby said tractor and ditching machine may at certain times be propelled by power delivered through said power take-off and at other times by the tractor ground engaging means.

3. In a ditching machine adapted for connection with a standard farm tractor provided with steering mechanism, a power take-off and at least one ground engaging driving wheel, the combination of a frame, at least one ground engaging driving wheel and an excavating mechanism connected with said frame, and means for driving said last mentioned ground wheel and excavating mechanism, said means being connected with for operation by the power take-off of said tractor, whereby said tractor and ditching machine may at certain times be propelled by power delivered through said power take-off mechanism while being steered by the steering mechanism of the tractor.

4. In a ditching machine adapted for connection with a standard farm tractor provided with steering mechanism, a power take-off and at least one ground engaging driving wheel, the combination of a frame, at least one ground engaging driving wheel and an excavating mechanism connected with said frame, and means for driving said last mentioned ground wheel and excavating mechanism, said means being connected with for operation by the power take-off of said tractor, whereby said tractor and ditching machine may at certain times be propelled by power delivered through said power take-off mechanism while being steered by the steering mechanism of the tractor, and means carried by the ditching machine and connected to the tractor steering mechanism for actuating said steering mechanism from a position on the ditching machine.

5. In an earth working machine adapted for connection with a standard farm tractor provided with a power take-off, the combination of a frame, ground engaging means secured to said frame, earth working mechanism, and means for driving said ground engaging means and earth working mechanism, said means being connected with for operation by the power take-off of said tractor.

6. In an earth working machine adapted for connection with a standard farm tractor provided with a power take-off and ground engaging driving means, the combination of a frame, ground engaging driving means, and an earth working mechanism connected with said frame, and means for driving said last mentioned ground engaging means and earth working mechanism, said means being connected with for operation by the power take-off of said tractor, whereby said tractor and earth working machine may at certain times be propelled by power delivered through said power take-off and at other times by the tractor ground engaging means.

7. In a ditching machine adapted for connection with a standard farm tractor provided with a power take-off, the combination of a frame, ground engaging means, excavating mechanism, and means for driving said ground engaging means and excavating mechanism, said means being connected with for operation by the power take-off of said tractor, together with means for varying at will the speed ratio between the excavating mechanism and the ditching machine ground engaging driving means.

8. In a ditching machine adapted for connection with a standard farm tractor provided with a power take-off, the combination of a frame, at least one ground engaging wheel, excavating mechanism, and means for driving said ground wheel and excavating mechanism, said means being connected with for operation by the power take-off of said tractor, together with means for varying at will the speed ratio between the excavating mechanism and the ditching machine driving wheel, said last mentioned means comprising a ratchet wheel, two dogs operating thereon and means for varying the range of movement of said dogs.

9. In a ditching machine adapted for connection with a standard farm tractor provided with steering mechanism, a driving motor, speed control means for the motor, a power take-off, and ground engaging driving means, the combination of a frame, ground engaging driving means, and an excavating mechanism connected with said frame, and means for driving said last mentioned ground engaging means and excavating mechanism, said means being connected with for operation by the power take-off of said tractor, whereby said tractor and ditching machine may at certain times be propelled by power delivered through said power take-off mechanism while being steered by the steering mechanism of the tractor, and means carried by the ditching machine and connected to the tractor steering mechanism for actuating said steering mechanism from a position on the ditching machine, and means carried by the ditching machine and connected to the speed control means of the tractor.

10. In a machine of the class described, a tractor having ground engaging driving means, steering mechanism and a power take-off mechanism, in combination with a ditching machine having a frame hitched to the said tractor, ground engaging driving means associated with said frame, excavating mechanism supported thereby, and means for driving said excavating mechanism and said ditching machine ground engaging means from said power take-off whereby the ditching machine may be propelled and the tractor pushed forward at certain times by power delivered through said power take-off from the tractor to the ditching machine ground engaging means and at other times the ditching machine may be pulled by said tractor.

11. In a machine of the class described, a tractor having ground engaging driving means, steering mechanism and a power take-off mechanism, in combination with a ditching machine having a frame hitched to the said tractor, ground engaging driving means associated with said frame, excavating mechanism supported thereby, and means for driving said excavating mechanism and said ditching machine ground engaging means from said power take-off, whereby the ditching machine may be propelled by power delivered through said power take-off mechanism while it is steered by the steering mechanism of the tractor.

12. In a ditching machine adapted for connection with a standard farm tractor provided with a power take-off, and ground engaging driving means, the combination of a frame, ground engaging driving means and an excavating mechanism connected with said frame, the frame being hitched to and partly supported by said tractor, and means for driving said last mentioned ground engaging driving means and excavating mechanism, said means being connected with for operation by the power take-off of said tractor, whereby said tractor and ditching machine may at certain times be propelled by power delivered through said power take-off.

ALLEN A. DICKE.